US010007788B2

(12) United States Patent
Moon et al.

(10) Patent No.: US 10,007,788 B2
(45) Date of Patent: Jun. 26, 2018

(54) METHOD OF MODELING BEHAVIOR PATTERN OF INSTRUCTION SET IN N-GRAM MANNER, COMPUTING DEVICE OPERATING WITH THE METHOD, AND PROGRAM STORED IN STORAGE MEDIUM TO EXECUTE THE METHOD IN COMPUTING DEVICE

(71) Applicant: ELECTRONICS AND TELECOMMUNICATIONS RESEARCH INSTITUTE, Daejeon (KR)

(72) Inventors: Dae Sung Moon, Daejeon (KR); Ik Kyun Kim, Daejeon (KR); Han Sung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 180 days.

(21) Appl. No.: 15/017,504

(22) Filed: Feb. 5, 2016

(65) Prior Publication Data
US 2016/0232345 A1 Aug. 11, 2016

(30) Foreign Application Priority Data

Feb. 11, 2015 (KR) .................. 10-2015-0020977

(51) Int. Cl.
*G06F 21/56* (2013.01)
(52) U.S. Cl.
CPC ................ *G06F 21/566* (2013.01)
(58) Field of Classification Search
None
See application file for complete search history.

(56) References Cited

U.S. PATENT DOCUMENTS 6,308,313 B1 * 10/2001 Lakshminarayana ........................ G06F 17/5045
716/104
7,181,768 B1 * 2/2007 Ghosh .................. G06F 21/552
706/25

(Continued)

FOREIGN PATENT DOCUMENTS

| EP | 2 767 923 A2 | 8/2014 |
| KR | 10-2009-0005933 A | 1/2009 |
| KR | 10-2013-0076268 A | 7/2013 |

OTHER PUBLICATIONS

Heejun Kwon et al., "An Malware Classification System using Multi N-gram", Journal of Security Engineering, Dec. 2012, pp. 531-542, vol. 9, No. 6.

*Primary Examiner* — Malcolm Cribbs

(57) ABSTRACT

A computing device configured to execute an instruction set is provided. The computing device includes a system call hooker for hooking system calls that occur by the instruction set while the instruction set is executed, a category extractor for extracting a category to which each of the hooked system calls belongs with reference to category information associated with a correspondence relationship between a system call and a category, a sequence extractor for extracting one or more behavior sequences expressed in an N-gram manner from a full sequence of the hooked system calls with reference to the extracted category, and a model generator for generating a behavior pattern model of the system calls that occur when the instruction set is executed, based on a number of times that each of the extracted behavior sequences occurs.

6 Claims, 10 Drawing Sheets

(56) References Cited

U.S. PATENT DOCUMENTS

| | | | |
|---|---|---|---|
| 7,225,343 B1* | 5/2007 | Honig | G06F 21/554 713/189 |
| 7,971,255 B1* | 6/2011 | Kc | G06F 21/566 713/164 |
| 8,181,248 B2 | 5/2012 | Oh et al. | |
| 8,763,018 B2* | 6/2014 | Pope | G06F 9/546 717/140 |
| 8,887,281 B2* | 11/2014 | Honig | G06F 21/554 713/189 |
| 2003/0212902 A1* | 11/2003 | van der Made | G06F 21/563 726/26 |
| 2004/0205474 A1* | 10/2004 | Eskin | H04L 63/1416 713/188 |
| 2005/0268338 A1* | 12/2005 | Made | G06F 21/562 726/24 |
| 2006/0085854 A1* | 4/2006 | Agrawal | G06F 21/552 726/23 |
| 2007/0169192 A1* | 7/2007 | Main | G06F 21/554 726/22 |
| 2007/0204257 A1* | 8/2007 | Kinno | G06F 11/28 717/100 |
| 2009/0070746 A1* | 3/2009 | Dhurjati | G06F 11/3676 717/128 |
| 2009/0222922 A1* | 9/2009 | Sidiroglou | H04L 51/12 726/23 |
| 2010/0064369 A1* | 3/2010 | Stolfo | G06F 21/56 726/24 |
| 2010/0257253 A1* | 10/2010 | Saha | G06F 9/44589 709/217 |
| 2011/0154487 A1* | 6/2011 | Nakayama | G06F 11/3612 726/22 |
| 2011/0267964 A1* | 11/2011 | Baltatu | H04L 43/00 370/242 |
| 2011/0271343 A1 | 11/2011 | Kim et al. | |
| 2012/0137367 A1* | 5/2012 | Dupont | G06F 21/00 726/25 |
| 2012/0216242 A1* | 8/2012 | Uner | G06F 21/50 726/1 |
| 2013/0086572 A1* | 4/2013 | Iriumi | G06F 8/60 717/168 |
| 2014/0370850 A1* | 12/2014 | Meacham | H04L 63/1416 455/410 |
| 2016/0078362 A1* | 3/2016 | Christodorescu | G06N 99/005 706/12 |

* cited by examiner

FIG. 3

| Category | System Call | Category | System Call |
|---|---|---|---|
| Process | CreateProcess | File | ReadFile |
| | ExitProcess | | WriteFile |
| | TerminateProcess | | SearchFile |
| | OpenProcess | | FileInformation |
| | SearchProcess | Registry | CreateRegistry |
| | ProcessDEPPolicy | | DeleteRegistry |
| | InformationProcess | | OpenRegistry |
| Thread | CreateLocalThread | | ReadRegistry |
| | CreateRemoteThread | | WriteRegistry |
| | ExitThread | | QueryRegistry |
| | TerminateThread | Network | Connect |
| | OpenThread | | Listen |
| | SuspendThread | | Send |
| | ResumeThread | | Receive |
| Memory | ReadProcessMemory | | Download |
| | WriteProcessMemory | Service | CreateService |
| | HeapCreate | | DeleteService |
| | VirtualAlloc | | OpenService |
| | VirtualProtect | | StartService |
| File | CreateFile | Others | CreateMutex |
| | CopyFile | | OpenMutex |
| | MoveFile | | LoadLibrary |
| | DeleteFile | | WindowsHook |
| | OpenFile | | SetSecurity |

FIG. 4

| Category | Symbol |
|---|---|
| Process | P |
| Thread | T |
| Memory | M |
| File | F |
| Registry | R |
| Network | N |
| Service | S |
| Others | E |

FIG. 5

| # | System Call | Category | Symbol |
|---|---|---|---|
| 1 | CreateProcess | Process | P |
| 2 | CreateLocalThread | Thread | T |
| 3 | ReadProcessMemory | Memory | M |
| 4 | HeapCreate | Memory | M |
| 5 | CreateRegistry | Registry | R |
| 6 | CreateRegistry | Registry | R |
| 7 | OpenRegistry | Registry | R |
| 8 | CreateLocalThread | Thread | T |
| 9 | CreateService | Service | S |
| 10 | CreateService | Service | S |
| 11 | CreateService | Service | S |
| 12 | CreateService | Service | S |
| 13 | CreateService | Service | S |
| 14 | ExitThread | Thread | T |
| 15 | TerminateProcess | Process | P |

FIG. 6

| Full Sequence | P | T | M | M | R | R | R | T | S | S | S | S | S | T | P |
|---|---|---|---|---|---|---|---|---|---|---|---|---|---|---|---|
| 3-gram Behavior Sequence | P | T | M | | | | | | | | | | | | |
| | | T | M | M | | | | | | | | | | | |
| | | | M | M | R | | | | | | | | | | |
| | | | | M | R | R | | | | | | | | | |
| | | | | | R | R | R | | | | | | | | |
| | | | | | | R | R | T | | | | | | | |
| | | | | | | | R | T | S | | | | | | |
| | | | | | | | | T | S | S | | | | | |
| | | | | | | | | | S | S | S | | | | |
| | | | | | | | | | | S | S | S | | | |
| | | | | | | | | | | | S | S | S | | |
| | | | | | | | | | | | | S | S | T | |
| | | | | | | | | | | | | | S | T | P |

METHOD OF MODELING BEHAVIOR PATTERN OF INSTRUCTION SET IN N-GRAM MANNER, COMPUTING DEVICE OPERATING WITH THE METHOD, AND PROGRAM STORED IN STORAGE MEDIUM TO EXECUTE THE METHOD IN COMPUTING DEVICE

CROSS-REFERENCE TO RELATED APPLICATIONS

This U.S. non-provisional patent application claims priority under 35 U.S.C. § 119 to Korean Patent Application No. 10-2015-0020977 filed on Feb. 11, 2015, in the Korean Intellectual Property Office, the entire contents of which are incorporated herein by reference.

BACKGROUND

1. Technical Field

The present disclosure relates to a computing device, and more particularly, to a method of modeling a behavior pattern of an instruction set that is executed in a computing device in an N-gram manner, a computing device operating with the method, and a program to execute the method.

2. Description of the Related Art

Malicious codes are used in attacking specified or unspecified targets. Users of computing devices unwittingly execute files that are infected with malicious codes or download files that are infected with malicious codes through the Internet. When the files infected with the malicious codes are executed, a specific instruction set is executed by a processor of a computing device. The execution of the instruction set corresponding to the malicious codes cause various problems, such as leaks of personal information, system crash, denial of service, or the like. Accordingly, detecting malicious codes has been recently emphasized as an important issue.

In order to detect malicious codes, a static analysis and a dynamic analysis are performed. The static analysis is used for reversely analyzing a code of a file suspected to be infected with a malicious code. Through the static analysis, an instruction set executed by the malicious code is predicted. The dynamic analysis is used for directly checking an operation of a file suspected to be infected with a malicious code by executing the file.

Through the static and dynamic analyses, the file suspected to be infected with the malicious code may be analyzed and the malicious code may be detected therefrom. According to the static and dynamic analyses, a previously known malicious code may be accurately and rapidly detected based on a specific binary pattern and a specific behavior rule. However, it is difficult to detect a mutant malicious code or an unknown malicious code, and information of a new pattern and rule needs to be continuously collected.

The malicious code is covertly infiltrated to a target of attack via various routes and is concealed for a long time. Furthermore, an attack pattern of the malicious code becomes diversified and evolves. Due to these reasons, a method of modeling a behavior pattern of an instruction set executed by a malicious code and accurately detecting a mutant malicious code or an unknown malicious code is required.

SUMMARY

The present disclosure provides a method, a computing device, and a program for modeling a behavior pattern of an instruction set executed in the computing device. In some example embodiments, the behavior pattern of the instruction set may be modeled in an N-gram manner and may be expressed in a vector format. In some example embodiments, the behavior pattern of the instruction set may be dynamically obtained.

Some example embodiments of the present disclosure may provide a computing device configured to execute an instruction set. The computing device may include a system call hooker, a category extractor, a sequence extractor, and a model generator. The system call hooker may hook system calls that occur by the instruction set while the instruction set is executed. The category extractor may extract a category to which each of the hooked system calls belongs, with reference to category information associated with a correspondence relationship between a system call and a category. The sequence extractor may extract one or more behavior sequences expressed in an N-gram manner from a full sequence of the hooked system calls, with reference to the extracted category. The model generator may generate a behavior pattern model of the system calls that occur when the instruction set is executed, based on a number of times that each of the extracted behavior sequences occurs.

In some example embodiments, the extracted category may correspond to one of categories of process, thread, memory, file, registry, network, service, and others.

In some example embodiments, the model generator may generate the behavior pattern model by associating some or all of behavior sequences expressed in the N-gram manner with the number of times that each of the extracted behavior sequences occurs.

In some example embodiments, the behavior pattern model may be expressed in a vector format.

In some example embodiments, the category information may be stored in at least one of a first storage included in the computing device, or a second storage provided separately from the computing device.

In some example embodiments, the behavior pattern model may be stored in at least one of a first storage included in the computing device, or a second storage provided separately from the computing device.

In some example embodiments, the computing device may further include a behavior determiner configured to determine whether the executed instruction set is malicious, based on at least one of the generated behavior pattern model or the stored behavior pattern model.

In some example embodiments, the behavior determiner may compare at least one of one or more malicious pattern models generated in advance by executing one or more malicious codes with at least one of the generated behavior pattern model or the stored behavior pattern model to determine whether the executed instruction set is malicious.

In some example embodiments, the behavior determiner may compare at least one of one or more normal pattern models generated in advance by executing one or more normal codes with at least one of the generated behavior pattern model or the stored behavior pattern model to determine whether the executed instruction set is malicious.

In some example embodiments, the behavior determiner may classify the executed instruction set into one of a normal instruction set and a malicious instruction set based on the determined result.

Some example embodiments of the present disclosure may provide a non-transitory computer-readable storage medium storing a program configured to model a behavior pattern associated with system calls that occur by an instruction set executed in a computing device. The program executes a process, in the computing device, including: hooking, by a processor of the computing device, the system calls while the instruction set is executed under a control of the processor; extracting, by the processor, a category to which each of the hooked system calls belongs, with reference to category information stored in at least one of a first storage of the computing device or a second storage provided separately from the computing device; extracting, by the processor, one or more behavior sequences expressed in an N-gram manner from a full sequence of the hooked system calls, with reference to the extracted category; and generating, by the processor, a model of the behavior pattern based on a characteristic of the extracted behavior sequences.

In some example embodiments, the characteristic of the extracted behavior sequences may include a number of times that each of the extracted behavior sequences occurs.

In some example embodiments, the model of the behavior pattern may be expressed in a vector format, that is generated by associating all behavior sequences expressed in the N-gram manner with the number of times that each of the extracted behavior sequences occurs.

In some example embodiments, the process may further include storing information associated with the model of the behavior pattern in at least one of the first storage or the second storage.

In some example embodiments, the process may further include comparing at least one of the generated model of the behavior pattern or the stored model of the behavior pattern with a reference model to determine whether the executed instruction set is malicious or normal.

Some example embodiments of the present disclosure may provide a method for modeling a behavior pattern associated with system calls that occur by an instruction set executed in a computing device. The method may include: hooking, by the computing device, the system calls; extracting, by the computing device, a category to which each of the hooked system calls belongs; extracting, by the computing device, one or more behavior sequences expressed in an N-gram manner from a full sequence of the hooked system calls, with reference to the extracted category; and generating, by the computing device, a model of the behavior pattern expressed in a vector format, based on a number of times that each of the extracted behavior sequences occurs.

In some example embodiments, the hooking may include dynamically hooking the system calls while the instruction set is executed in the computing device.

In some example embodiments, the vector format may be obtained by associating some or all of the behavior sequences expressed in the N-gram manner with the number of times that each of the extracted behavior sequences occurs.

BRIEF DESCRIPTION OF THE DRAWINGS

The above and other aspects, features, and advantages of certain embodiments of the present disclosure will become apparent from the following detailed description with reference to the following figures, wherein like reference numerals refer to like parts throughout the various figures unless otherwise specified, and wherein:

FIG. 3 is a table illustrating an example of categories to which system calls occurring in the computing device of FIG. 1 belong;

FIG. 4 is a table illustrating a correspondence relationship between the categories of FIG. 3 and symbols for helping understanding of the present disclosure;

FIG. 5 is a table illustrating example occurrences of system calls for helping understanding of the present disclosure;

FIG. 6 is a conceptual diagram illustrating a full sequence and behavior sequences according to the example of FIG. 5;

DETAILED DESCRIPTION OF EMBODIMENTS

The aforementioned features and the following descriptions are exemplarily provided to help the understanding about example embodiments of the present disclosure. The present disclosure, namely, may be embodied in a variety of different forms. The following example embodiments are merely exemplified to fully disclose the features of the present disclosure, and fully convey the concept of the present disclosure to those skilled in the art. Therefore, it should be comprehended that if there are many ways of implementing configurations of elements according to the present disclosure, a specific one of the ways or any one of the equivalents thereof may be available to accomplish the present disclosure.

In the description, when some configuration is mentioned as including specific elements or some process is mentioned as including specific steps, it means that other elements or steps may be further included therein. The terms used herein are used merely for explaining a specific form of an example embodiment, which should not be construed to limit the scope of the present disclosure. Furthermore, exemplary illustrations explained to help the understanding about the present disclosure may also include their complementary embodiments.

The terms used herein have meanings which are generally comprehensible by those skilled in the art. Generally used terms should be construed as being consistent in correspondence with coherence of description. The terms used herein should not be understood as having excessively ideal or formal meanings unless the meanings are defined clearly. Hereinafter, some example embodiments of the present disclosure will be described in conjunction with accompanying drawings.

Figure 1:
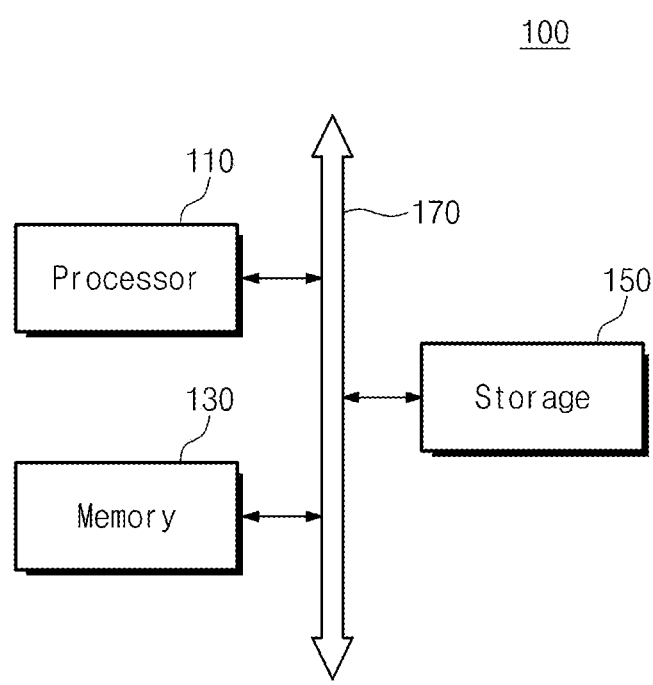
FIG. 1 is a block diagram illustrating a computing device according to an example embodiment.

FIG. 1 is a block diagram illustrating a computing device according to an example embodiment. For example, a computing device 100 may include a processor 110, a memory 130, a storage 150, and a bus 170. However, the computing device 100 may further include other elements (e.g. a communication module, a user interface, or the like) not shown in FIG. 1. Alternatively, the computing device 100 may not include one or more of the components shown in FIG. 1. For example, the computing device 100 may be one of a personal computer, a workstation, a notebook computer, a mobile device, or the like.

The processor 110 may process operations performed in the computing device 100. For example, the processor 110 may include one or more processor cores. For example, the processor 110 may be one of a general purpose processor, a workstation processor, an application processor, or the like.

The memory 130 may store data processed or to be processed by the processor 110. For example, the memory 130 may include a volatile memory such as a static random access memory (SRAM), a dynamic RAM (DRAM), or a synchronous DRAM (SDRAM), and/or a nonvolatile memory such as a flash memory, a phase-change RAM (PRAM), a magneto-resistive RAM (MRAM), a resistive RAM (ReRAM), or a ferro-electric RAM (FRAM). Alternatively, the memory 130 may include heterogeneous memories.

The storage 150 may store data regardless of power supply. For example, the storage 150 may store files used to drive an operating system, execution files of an application, and user data. For example, the storage 150 may be a storage medium including a nonvolatile memory, such as a hard disk drive (HDD), a solid state drive (SSD), a secure digital (SD) card, or a universal serial bus (USB) memory device.

The computing device 100 may execute an instruction set. The instruction set may be executed under a control of the processor 110. For example, when a specific file or process is executed in the computing device 100, an instruction set corresponding to the specific file or process may be executed.

For example, the storage 150 may store executable files. When a request for executing a file is provided from a user of the computing device 100, the processor 110 may load data required to execute the file from the storage 150 to the memory 130. The processor 110 may process operations required to execute the file by means of the data loaded on the memory 130. For example, the processor 110 may execute the instruction set corresponding to the executed file by means of the data loaded on the memory 130.

When the instruction set is executed in the computing device 100, various types of system calls may occur. The system calls may be processed by an operating system. According to this, the executed file may provide services to the user of the computing device 100 by means of resources of the computing device 100. Example system calls occurring in the computing device 100 will be described with reference to FIG. 3.

In an example embodiment, the computing device 100 may hook system calls under a control of the processor 110. "Hooking" means an operation for intercepting a function call, a system message, or an event. System calls occurring when the instruction set is executed in the computing device 100 may be understood by hooking the system calls. The hooked system calls may be used for generating a behavior pattern model according to an example embodiment. Generating the behavior pattern model will be described with reference to FIGS. 2 to 7.

The bus 170 may provide communication paths between the components of the computing device 100. For example, the processor 110, memory 130, and storage 150 may exchange data with one another through the bus 170. The bus 170 may be configured to support various types of communication formats used in the computing device 100.

Figure 2:
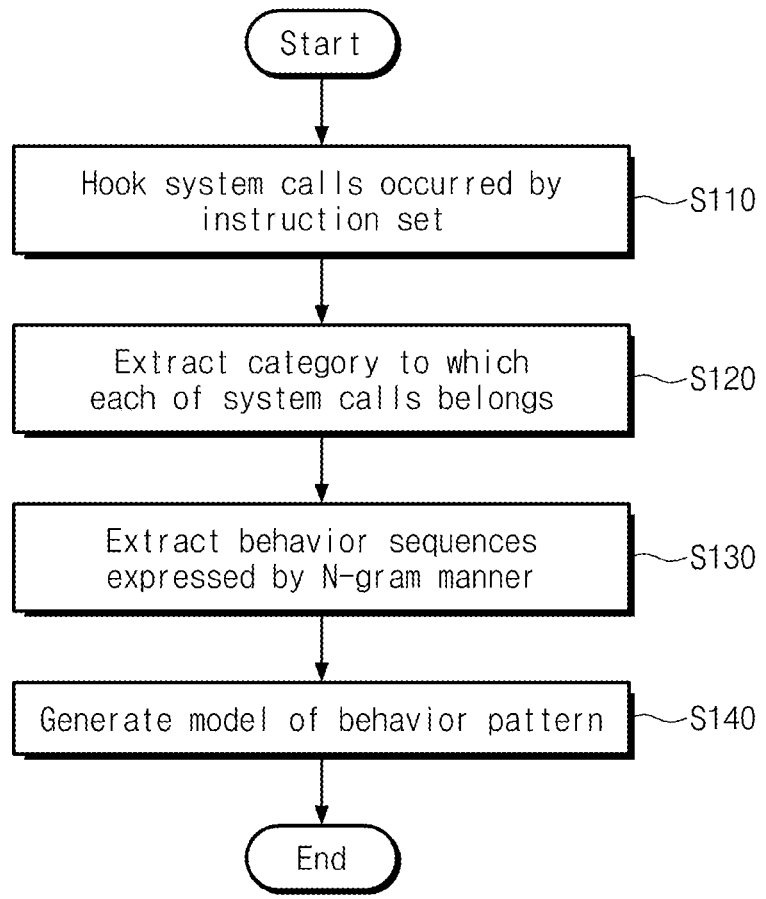
FIG. 2 is a flowchart describing a modeling method according to an example embodiment.

FIG. 2 is a flowchart describing a modeling method according to an example embodiment. The modeling method described in FIG. 2 may be performed by, for example, the computing device 100 illustrated in FIG. 1. The modeling method described in FIG. 2 may be used for modeling a behavior pattern associated with system calls occurring by the instruction set executed in the computing device 100.

In operation S110, the system calls may be hooked. More particularly, the system calls that occur by the instruction set executed in the computing device 100 may be hooked. Operation S110 is not performed with respect to a text section of an execution file. In an example embodiment, while the instruction set corresponding to the execution file or a process is being executed, operation S110 may be dynamically performed. For example, operation S110 may be performed by the processor 110 (see FIG. 1) of the computing device 100.

In operation S120, a category to which each of the system calls hooked in operation S110 belongs may be extracted. The category may be associated with a behavior performed by the system call. For example, some system calls may occur in order to access the memory 130 (See FIG. 1) of the computing device 100, and some other system calls may occur in order to access a file stored in the storage 150 (See FIG. 1) of the computing device 100. The categories to which the system calls belong will be further described with reference to FIG. 3. For example, operation S120 may be performed by the processor 110 of the computing device 100.

In operation S130, one or more behavior sequences may be extracted from a full sequence of the system calls hooked in operation S110. The full sequence may mean a list of all the hooked system calls. The behavior sequence may mean a list extracted from the full sequence in an N-gram manner. The full sequence and the behavior sequences will be described in detail with reference to FIG. 6. The behavior sequences may be extracted with reference to the categories extracted in operation S120. For example, operation S130 may be performed by the processor 110 of the computing device 100.

In an example embodiment, the behavior sequence may be obtained in the N-gram manner. The N-gram manner is used to divide a string into sub-strings, wherein each sub-string includes N letters. For example, when an overlapping 4-gram manner is applied to a string of "learning", five sub-strings of "lear", "earn", "arni", "rnin", and "ning" are obtained. For example, when a consecutive 2-gram manner is applied to the string of "learning", two sub-strings of "lear" and "ning" are obtained. In an example embodiment, the N-gram manner may be used for modeling the behavior pattern of the system calls occurring by the instruction set.

In operation S140, a model of the behavior pattern associated with the system calls may be generated. The behavior pattern model may be generated based on a characteristic of the one or more behavior sequences extracted in operation S130. For example, the characteristic of the behavior sequences may include the number of times that each of the behavior sequences occurs. In this example, the behavior pattern model may be generated based on the number of times that each of the behavior sequences occurs. The behavior pattern model will be described in detail with reference to FIG. 7. For example, operation S140 may be performed by the processor 110 of the computing device 100.

The behavior pattern model may represent a behavior characteristic of the instruction set executed in the computing device 100. This is because system calls occurring by one instruction set may be different from system calls occurring by another instruction set.

When the behavior characteristic of the instruction set is defined according to an example embodiment, the behavior pattern model may be used to determine whether the executed instruction set is malicious. This is because system calls occurring by an instruction set corresponding to a malicious code may be distinguished from system calls occurring by an instruction set corresponding to a normal code. Furthermore, the behavior pattern model may be provided as an input of various data mining schemes for learning of a computing device.

In some example embodiments, the modeling method described in FIG. 2 may be implemented with a program configured to execute a process including operations S110 to S140 in the computing device 100. The program may be written in a machine-executable language, or may be written in a human-understandable language and then be compiled (or interpreted). This program may be stored in a storage medium (e.g. the storage 150 of the computing device 100). The storage medium may be a "non-transitory computer-readable storage medium". Alternatively, this program may be distributed through a communication network.

In some other example embodiments, the modeling method described in FIG. 2 may be implemented with a hardware module. These example embodiments will be described with reference to FIG. 8.

FIG. 3 is a table illustrating an example of categories to which system calls occurring in the computing device of FIG. 1 belong. In some example embodiments, each of the system calls that occur when the instruction set is executed may correspond to one of categories of process, thread, memory, file, registry, network, service, and others.

For example, a system call "CreateProcess" may belong to the process category, and a system call "ReadFile" may belong to the file category. For example, when the instruction set is executed and the system call "ReadFile" occurs, a process (e.g. a read operation) for the system file may be performed. For example, an API function call "NtOpenThread" of the Windows operating system may correspond to a system call "OpenThread" of the thread category.

When the instruction set is executed, one or more system calls may occur. In some example embodiments, the system calls may be hooked under a control of the processor 110 (see FIG. 1) of the computing device 100 (see FIG. 1). The system calls that occur when the instruction set is executed in the computing device 100 may be understood by hooking the system calls.

FIG. 3 is just an example to help understanding of the present disclosure. FIG. 3 shows categories of process, thread, memory, file, registry, network, service, and others as categories to which the system calls belong. However, the categories to which the system calls belong may be variously changed or modified. For example, the categories to which the system calls belong may be changed or modified according to an operating system employed in the computing device 100. Furthermore, the types and the number of the system calls belonging to each of the categories may also be variously changed or modified.

For example, the categories to which the system calls belong may be designed in more detail or more roughly than those shown in FIG. 3. In other words, the number of categories to which the system calls belong may be greater than or smaller than 8. For example, the categories to which the system calls belong may be uniquely selected. Alternatively, the categories to which the system calls belong may be designed to be dynamically changed depending on an system environment. The example embodiments may be variously changed or modified.

FIG. 4 is a table illustrating a correspondence relationship between the categories shown in FIG. 3 and symbols (i.e., abbreviations) for helping understanding of the present disclosure.

In the description below, a case where a system call belonging to the process category occurs will be expressed with a symbol "P". Furthermore, cases where system calls belonging to the categories of thread, memory, file, registry, network, service and others occur will be expressed with symbols "T", "M", "F", "R", "N", "S", and "E", respectively.

However, the above symbols are provided to help understanding of the present disclosure and for brevity of description. Categories extracted in practice from the computing device 100 (See FIG. 1) may be expressed in other forms different from the above symbols. FIG. 4 is not intended to limit the present disclosure.

FIG. 5 is a table illustrating example occurrences of system calls for helping understanding of the present disclosure. As an example to help understanding of the present disclosure, it is assumed that 15 system calls shown in FIG. 5 occur by an instruction set, while the instruction set is being executed in the computing device 100 (see FIG. 1).

For example, it is assumed that a system call "CreateProcess" firstly occurs with the instruction set being executed in the computing device 100. For example, in operation S110 of FIG. 2, the system call "CreateProcess" may be hooked by the processor 110 (see FIG. 1) of the computing device 100. Referring to the table shown in FIG. 3, the system call "CreateProcess" belongs to the process category. For example, in operation S120 of FIG. 2, the process category may be extracted by the processor 110 of the computing device 100. The occurrence of the system call "CreateProcess" may be expressed as a symbol "P".

Following the system call "CreateProcess", it is assumed that a system call "CreateLocalThread" secondly occurs. For example, in operation S110 of FIG. 2, the system call "CreateLocalThread" may be hooked by the processor 110 of the computing device 100. Referring to the table shown in FIG. 3, the system call "CreateLocalThread" belongs to the thread category. For example, in operation S120 of FIG. 2, the thread category may be extracted by the processor 110 of the computing device 100. The occurrence of the system call "CreateLocalThread" may be expressed as a symbol "T".

Figure 7:
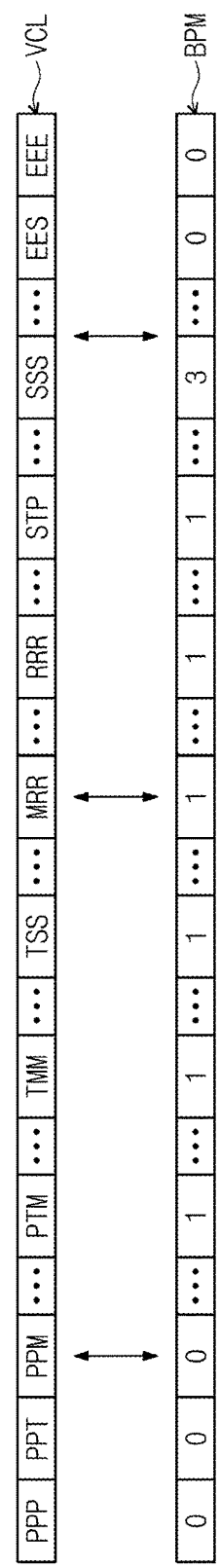
FIG. 7 is a conceptual diagram illustrating a behavior pattern model according to the examples of FIGS. 5 and 6.

Following the system call "CreatLocalThread", it is assumed that the third system call "ReasProcessMemory" to the 15th system call "TerminateProcess" occur. Descriptions associated with the third to 15th system calls will be omitted below for brevity of description. FIGS. 6 and 7 will be provided to describe an example embodiment based on the example shown in FIG. 5.

FIG. 6 is a conceptual diagram illustrating a full sequence and behavior sequences according to the example of FIG. 5. For example, the full sequence and behavior sequences shown in FIG. 6 may be generated and extracted in operation S130 of FIG. 2.

Firstly, the full sequence of system calls may be generated with reference to the categories extracted in operation S120 of FIG. 2. As described with reference to FIG. 2, the full sequence may mean a list of all hooked system calls. According to the example illustrated in FIG. 5, as shown in FIG. 6, the full sequence of "P T M M R R R T S S S S S T P" may be generated.

Next, one or more behavior sequences may be extracted from the full sequence of the system calls. As described with reference to FIG. 2, the behavior sequence may mean a list extracted from the full sequence in the N-gram manner.

As an example to help understanding of the present disclosure, it is assumed that an overlapping 3-gram manner is used. When the overlapping 3-gram manner is applied to the full sequence of system calls, as shown in FIG. 6, behavior sequences of "P T M", "T M M", "M M R", "M R R", "R R R", "R R T", "R T S", "T S S", "S S S", "S S S", "S S S", "S S T", and "S T P" may be extracted. In this example, the behavior sequence "S S S" may be obtained three times, and each of other behavior sequences may be obtained once.

However, the above example is provided to help understanding of the present disclosure, and the present disclosure is not limited thereto. In order to extract the one or more behavior sequences from the full sequence, a consecutive 3-gram manner may be used. Alternatively, the N-gram manner (e.g. a 2-gram or 4-gram manner) other than the 3-gram manner may be used. FIG. 7 will be provided to describe an example embodiment based on the examples shown in FIGS. 5 and 6.

FIG. 7 is a conceptual diagram illustrating a behavior pattern model according to the examples of FIGS. 5 and 6. For example, the behavior pattern model (BPM) shown in FIG. 7 may be generated in operation S140 of FIG. 2.

First, a vector component list (VCL) may be provided. The vector component list may be a list of "all" behavior sequences expressed in the N-gram manner. For example, when a 3-gram manner is applied to 8 categories, 512 ($=8^3$) behavior sequences from a behavior sequence "P P P" to a behavior sequence "E E E" may be combined. Each of the 512 behavior sequences may be included in the vector component list as a vector component.

The 512 behavior sequences may be combined, but some of the 512 behavior sequences may not occur in some cases. In the example shown in FIG. 6, the behavior sequence "S S S" may be generated three times, and behavior sequences "P T M", "T M M", "M M R", "M R R", "R R R", "R R T", "R T S", "T S S", "S S S", "S S S", "S S T" and "S T P" may be generated once. However, other behavior sequences (e.g. "P P P", "P P M", and "E E E") may not be generated.

In some example embodiments, in order to generate the behavior pattern model, the number of times that each of the behavior sequences occurs may be referred. The number of occurrences of each of behavior sequences that are extracted when one instruction set is executed may be different from the number of occurrences of each of behavior sequences that are extracted when another instruction set is executed. Accordingly, the number of times that each behavior sequence occurs may be referred as a "behavior characteristic" for distinguishing the instruction sets from one another.

In some example embodiments, the behavior pattern model may be generated by associating the vector component list with the number of times that each of the behavior sequences occurs. For example, according to the example shown in FIG. 6, since the behavior sequence "P T M" occurs once, a vector component of "P T M" included in the vector component list may correspond to "1". Since the behavior sequence "S S S" occurs three times, a vector component of "S S S" included in the vector component list may correspond to "3". According to this process, the behavior pattern model for distinguishing the instruction sets may be generated.

In some example embodiments, the behavior pattern model may be expressed in a vector format. According to the examples shown in FIGS. 6 and 7, the behavior pattern model may be expressed in a vector having 512 dimensions. The behavior pattern model of the examples shown in FIGS. 6 and 7 may be expressed with a vector of (0, 0, 0, . . . , 1, . . . , 1, . . . , 1, . . . , 1, . . . , 1, . . . , 1, . . . , 3, . . . , 0, 0).

However, the above example embodiments are just examples to help understanding of the present disclosure, but not to limit the present disclosure. For example, the vector component list may include, as vector components, some of the behavior sequences, not all the behavior sequences, expressed in the N-gram manner. In other words, the behavior pattern model may be expressed with a vector having dimensions smaller than 512. For example, when the behavior sequence "P P P" is barely extracted or is not necessary to be used, the vector component list may not include a vector component of "P P P", and the behavior pattern model may not include a component corresponding to the behavior sequence "P P P". In this example, the behavior pattern model may be expressed with a vector having 511 dimensions.

Furthermore, the number of vector components that represent the behavior pattern model may be changed or modified depending upon the implementation of example embodiments. The number of vector components that represent the behavior pattern model may be changed or modified depending upon the number of letters included in a sub-string that is extracted from a full sequence in the N-gram manner. Furthermore, the number of vector components that represent the behavior pattern model may be changed or modified depending upon the number of categories to which the system calls belong. For example, when a 4-gram manner is applied to 6 categories, the maximum number of vector components that represent the behavior pattern model may be 1296 ($=6^4$).

In some example embodiments, the behavior pattern model may further include another information in addition to information associated with the number of times that each of the behavior sequences occurs. For example, the behavior pattern model may further include additional information such as an identification number of a process corresponding to an instruction set, and a type of an execution file. An example embodiment may be variously changed or modified, and is not limited to the above descriptions.

A behavior characteristic of an instruction set may be understood based on the behavior pattern model. The behavior pattern model may be used to determine whether the instruction set is malicious. Furthermore, the behavior pattern model may be provided as an input of various data mining schemes for learning of a computing device.

Figure 8:
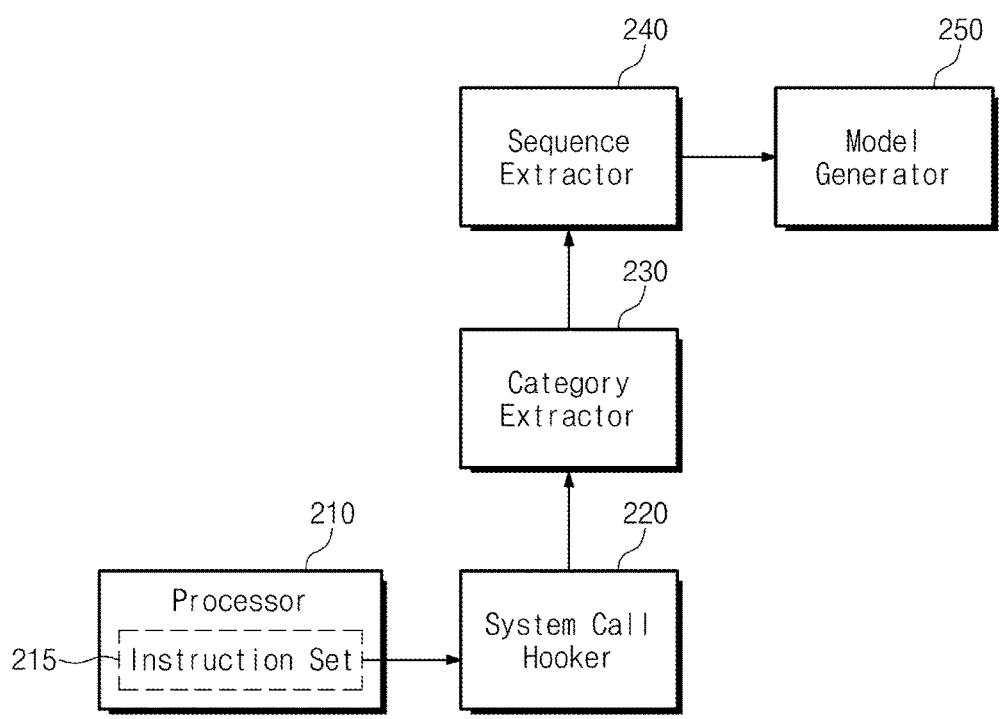
FIG. 8 is a block diagram illustrating a computing device according to an example embodiment.

FIG. 8 is a block diagram illustrating a computing device according to an example embodiment. A computing device 200 may include a processor 210, a system call hooker 220, a category extractor 230, a sequence extractor 240, and a model generator 250. The modeling method of FIG. 2 may be implemented in the computing device 200 with a hardware module.

The computing device 200 may execute an instruction set 215. The instruction set 215 may be executed under a control of the processor 210. For example, when a specific file or process is executed in the computing device 200, the instruction set 215 corresponding to the specific file or process may be executed.

The system call hooker 220 may hook system calls that occur by the instruction set 215. While the instruction set 215 corresponding to an execution file or a process is being executed, the system call hooker 220 may dynamically hook the system calls. An example of the hooked system calls has been described with reference to FIG. 5.

The category extractor 230 may extract a category to which each of the system calls hooked by the system call hooker 220 belongs. The category extractor 230 may operate with reference to category information associated with a correspondence relationship between a system call and a category. For example, the category extractor 230 may extract categories to which the hooked system calls belong by referring to information corresponding to the table shown in FIG. 3. An example of the extracted categories has been described with reference to FIG. 5.

The sequence extractor 240 may extract one or more behavior sequences from a full sequence of the system calls hooked by the system call hooker 220. The behavior sequences may be extracted in the N-gram manner. The sequence extractor 240 may extract the behavior sequences with reference to the category extracted by the category extractor 230. An example of extracting the behavior sequences has been described with reference to FIG. 6.

The model generator 250 may generate a behavior pattern model of the system calls based on a characteristic of the behavior sequences extracted by the sequence extractor 240. As an example embodiment, the behavior pattern model may be generated based on the number of times that each of the behavior sequences extracted by the sequence extractor 240 occurs. An example of generating the behavior pattern model has been described with reference to FIG. 7.

Figure 9:
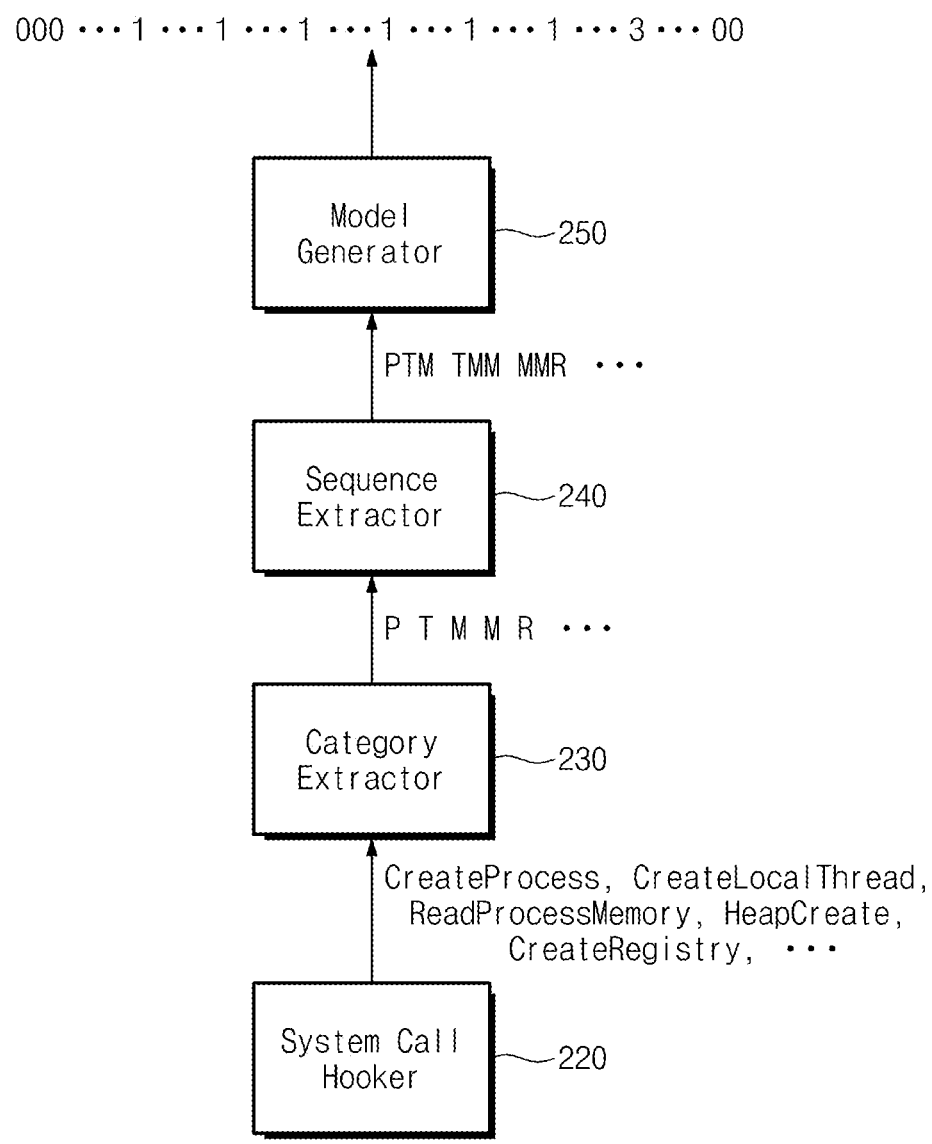
FIG. 9 is a conceptual diagram for describing an operation of the computing device of FIG. 8.

FIG. 9 is a conceptual diagram for describing an operation of the computing device of FIG. 8. In order to help understanding of the present disclosure, it is assumed that the system calls shown in FIG. 5 occur while the instruction set 215 (see FIG. 8) is being executed under a control of the processor 210 (see FIG. 8).

The system call hooker 220 may hook the system calls shown in FIG. 5. The hooked system calls may be provided to the category extractor 230. The category extractor 230 may extract a category to which each of the system calls hooked by the system call hooker 220 belongs. The extracted categories may be provided to the sequence extractor 240.

The sequence extractor 240 may extract one or more behavior sequences expressed in the N-gram manner with reference to the category extracted by the category extractor 230. The extracted behavior sequences may be provided to the model generator 250. The model generator 250 may generate a behavior pattern model with reference to the behavior sequences extracted by the sequence extractor 240.

In some example embodiments, the behavior pattern model may be generated based on the number of times that each of the one or more behavior sequences extracted by the sequence extractor 240 occurs. In these example embodiments, the behavior pattern model may be generated by associating some of all of the behavior sequences expressed in the N-gram manner with the number of times that each of the behavior sequences occurs. For example, the behavior pattern model may be expressed in a vector format. An example of generating the behavior pattern model has been described with reference to FIGS. 5 to 7. Accordingly, redundant descriptions will be omitted below.

Figure 10:
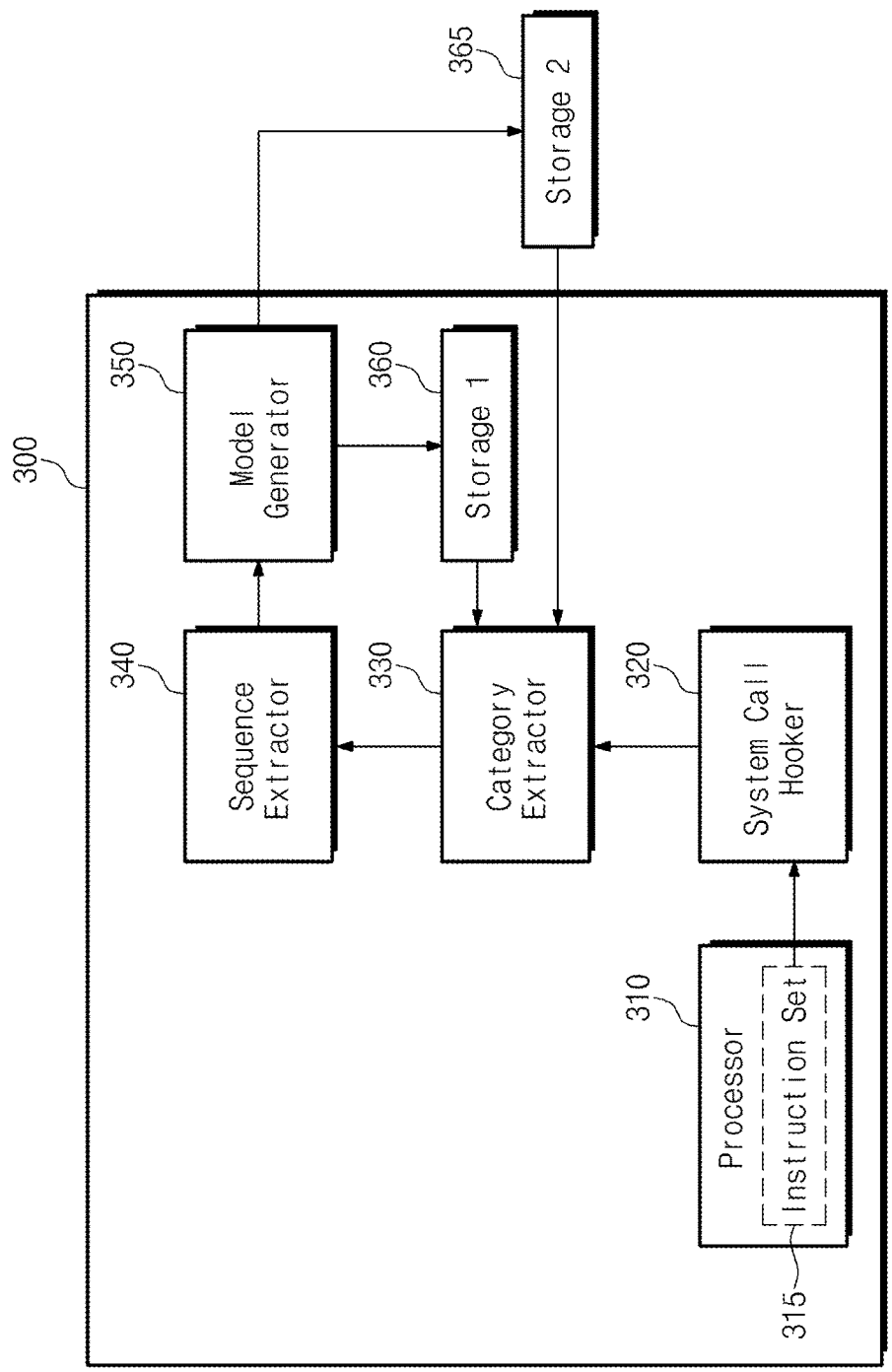
FIGS. 10 and 11 are block diagrams illustrating computing devices according to example embodiments.

FIG. 10 is a block diagram illustrating a computing device according to an example embodiment. A computing device 300 may include a processor 310, a system call hooker 320, a category extractor 330, a sequence extractor 340, a model generator 350, and a first storage 360. Furthermore, a second storage 365 may be provided separately from the computing device 300.

Configurations and functions of the processor 310, the system call hooker 320, the category extractor 330, the sequence extractor 340 and the model generator 350 may include those of the processor 210, the system call hooker 220, the category extractor 230, the sequence extractor 240 and the model generator 250 of FIG. 8, respectively. For brevity of description, redundant descriptions associated with the processor 310, the system call hooker 320, the category extractor 330, the sequence extractor 340, and the model generator 350 will be omitted below.

Each of the first storage 360 and the second storage 365 may store data. The first storage 360 may be included in the computing device 300. For example, the first storage 360 may be a storage medium such as an HDD or an SSD included in the computing device 300. On the other hand, the second storage 365 may be provided separately from the computing device 300. For example, the second storage 365 may be a storage medium, which is not included in the computing device 300, such as an external storage device or a server-side storage connected through a network.

In some example embodiments, at least one of the first storage 360, the second storage 365, and a combination thereof may store category information. The category information may include information associated with a correspondence relationship between a system call and a category. For example, the category information may include information corresponding to the table shown in FIG. 3. In some example embodiments, the category extractor 330 may operate with reference to the category information stored in at least one of the first storage 360, the second storage 365, and a combination thereof. In some example embodiments, operation S120 of FIG. 2 may be performed with reference to the category information stored in at least one of the first storage 360, the second storage 365, and a combination thereof.

In some example embodiments, at least one of the first storage 360, the second storage 365, and a combination thereof may store information associated with a behavior pattern model. The model generator 350 may generate the behavior pattern model, and then may store the information associated with the behavior pattern model in at least one of the first storage 360, the second storage 365, and a combination thereof. The stored behavior pattern model may be used to determine whether the instruction set 315 is malicious. Alternatively, the stored behavior pattern model may be provided as an input of various data mining schemes for learning of the computing device 300.

In some example embodiments, the modeling method of FIG. 2 may further include an operation for storing the information associated with the behavior pattern model in at least one of the first storage 360, the second storage 365, and a combination thereof. Furthermore, when the modeling method of FIG. 2 is implemented with a program, the program may execute, in the computing device 300, a process including an operation for storing the information associated with the behavior pattern model in at least one of the first storage 360, the second storage 365, and a combination thereof.

Figure 11:
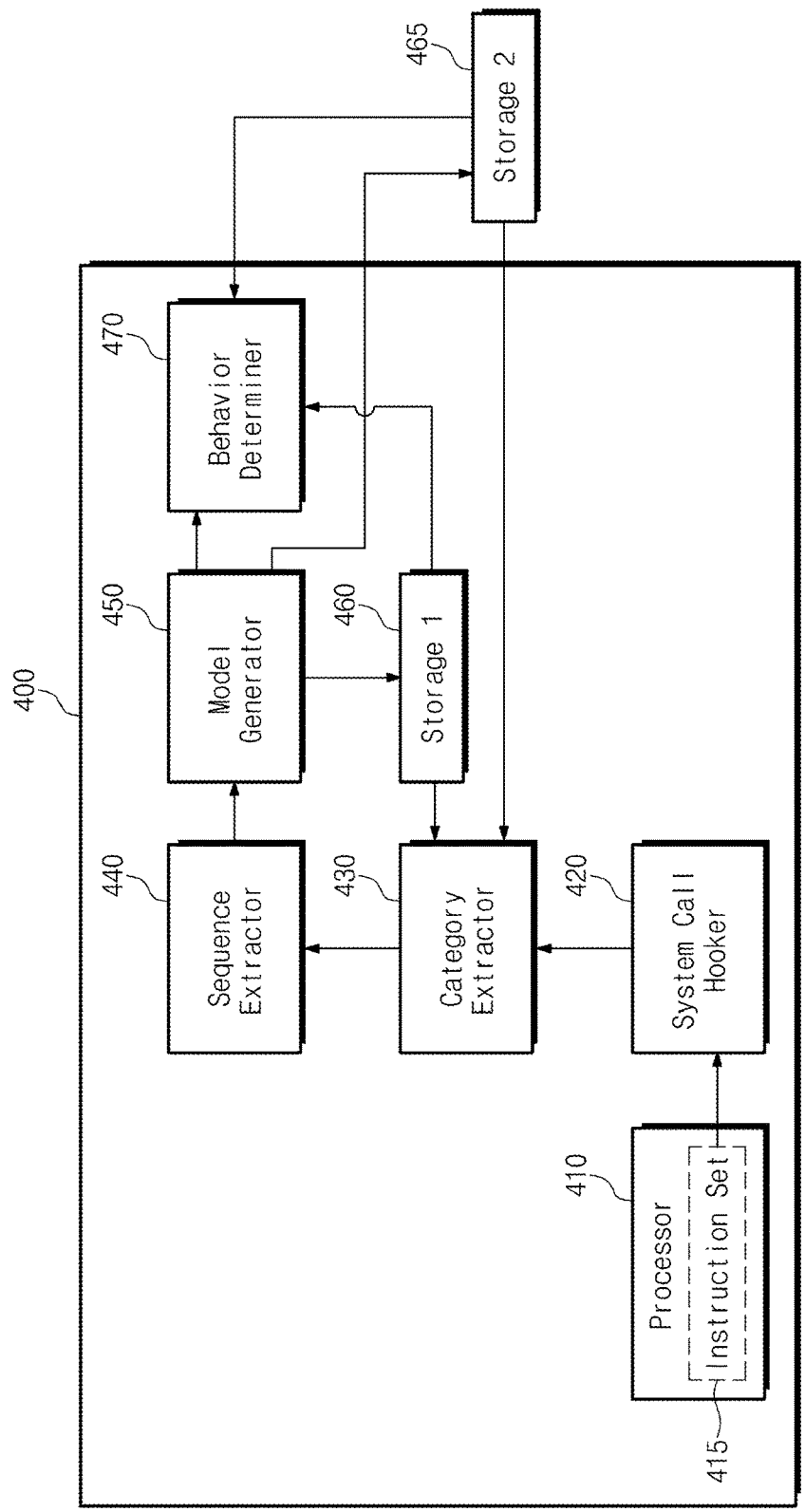

FIG. 11 is a block diagram illustrating a computing device according to an example embodiment. A computing device 400 may include a processor 410, a system call hooker 420, a category extractor 430, a sequence extractor 440, a model generator 450, a first storage 460, and a behavior determiner 470. Furthermore, a second storage 465 may be provided separately from the computing device 400.

Configurations and functions of the processor 410, the system call hooker 420, the category extractor 430, the sequence extractor 440 and the model generator 450 may include those of the processor 210, the system call hooker 220, the category extractor 230, the sequence extractor 240 and the model generator 250 of FIG. 8, respectively. The configurations and functions of the first storage 460 and the second storage 465 may include those of the first storage 360 and the second storage 365 of FIG. 10, respectively. For brevity of description, redundant descriptions associated with the processor 410, the system call hooker 420, the category extractor 430, the sequence extractor 440, the model generator 450, the first storage 460, and the second storage 465 will be omitted below.

The behavior determiner 470 may determine whether the instruction set 415 is malicious. For example, the behavior determiner 470 may dynamically determine whether the instruction set 415 is malicious based on the behavior pattern model generated by the model generator 450. Alternatively, the behavior determiner 470 may determine whether the instruction set 415 is malicious based on the behavior pattern model stored in the first storage 460 and/or the second storage 465. A process of determining whether the instruction set 415 is malicious will be described with reference to FIG. 12.

Figure 12:
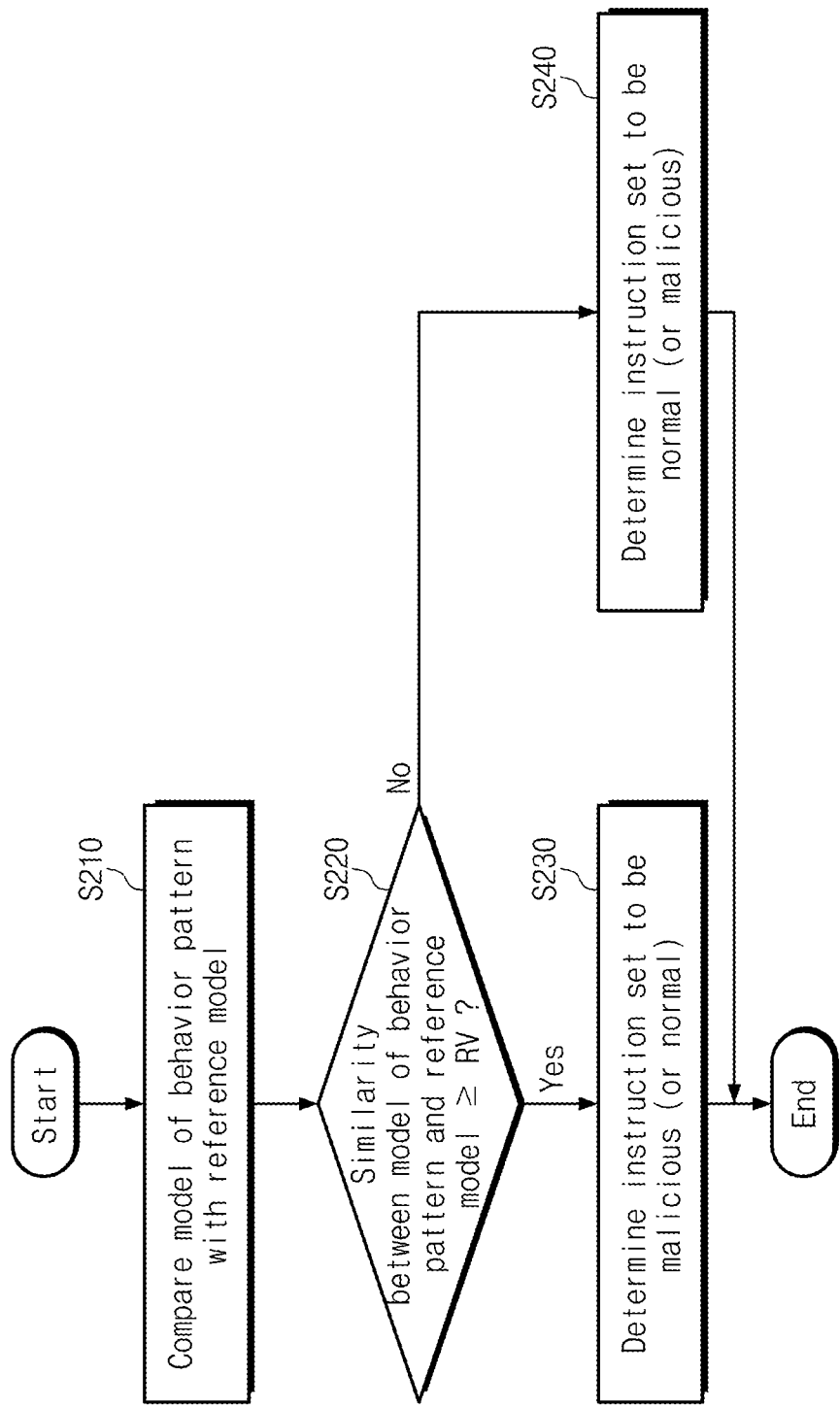
FIG. 12 is a flowchart describing a method for determining a malicious pattern according to an example embodiment.

FIG. 12 is a flowchart describing a method for determining a malicious pattern according to an example embodiment. In order to help understanding of the present disclosure, FIGS. 11 and 12 will be referred together. For example, the method of determining a malicious pattern described in FIG. 12 may be performed by the behavior determiner 470 of the computing device 400.

For example, one or more behavior pattern models may be generated in advance, by executing one or more malicious codes that are known as being malicious. Accordingly, information associated with the behavior pattern of the malicious code may be collected in advance. The behavior pattern model generated by executing the malicious code may be referred to as a "malicious pattern model" hereinafter.

Referring to the malicious pattern model, a behavior characteristic of system calls that occur when the instruction set corresponding to the malicious code is executed may be understood. One or more malicious pattern models may be stored in a storage medium that may be referred by the behavior determiner 470. For example, the one or more malicious pattern models may be stored in at least one of the first storage 460, the second storage 465, and a combination thereof.

For example, one or more behavior pattern model may be generated in advance by executing one or more normal codes that are known as being normal. Accordingly, information associated with the behavior pattern of the normal code may be collected in advance. The behavior pattern model generated by executing the normal code may be referred to as a "normal pattern model" hereinafter.

Referring to the normal pattern model, a behavior characteristic of system calls that occur when the instruction set corresponding to the normal code is executed may be understood. One or more normal pattern models may be stored in a storage medium that may be referred by the behavior determiner 470. For example, one or more normal pattern models may be stored in at least one of the first storage 460, the second storage, and a combination thereof.

In operation S210, the behavior determiner 470 may compare a behavior pattern model generated by the model generator 450 (or a behavior pattern model stored in the first storage 460 and/or the second storage 465) with a "reference model". The reference model may be at least one of the one or more malicious pattern models. Alternatively, the reference model may be at least one of the one or more normal pattern models.

In operation S220, the behavior determiner 470 may calculate similarity between the behavior pattern model associated with the instruction set 415 and the reference model. Furthermore, the behavior determiner 470 may compare the calculated similarity with a reference value (RV). In operation S230 or S240, the behavior determiner 470 may determine whether the instruction set 415 is malicious or normal based on the comparison result.

For example, the behavior determiner 470 may compare the behavior pattern model associated with the instruction set 415 to the malicious pattern model. When the similarity between the behavior pattern model associated with the instruction set 415 and the malicious pattern model is equal to or greater than the reference value, the behavior determiner 470 may determine that the instruction set 415 is malicious. On the other hand, when the similarity between the behavior pattern model associated with the instruction set 415 and the malicious pattern model is smaller than the reference value, the behavior determiner 470 may determine that the instruction set 415 is normal.

Alternatively, the behavior determiner 470 may compare the behavior pattern model associated with the instruction set 415 to the normal pattern model. When the similarity between the behavior pattern model associated with the instruction set 415 and the normal pattern model is equal to or greater than the reference value, the behavior determiner 470 may determine that the instruction set 415 is normal. On the other hand, when the similarity between the behavior pattern model associated with the instruction set 415 and the normal pattern model is smaller than the reference value, the behavior determiner 470 may determine that the instruction set 415 is malicious.

The behavior determiner 470 may classify the instruction set 415 into one of a normal instruction set and a malicious instruction set based on the determined result. The classification result may be used to manage an operation policy of the computing device 400. Alternatively, the classification result may be provided as an input of various data mining schemes for learning of the computing device 400.

In some example embodiments, the modeling method of FIG. 2 may further include an operation for determining whether the instruction set 415 is malicious. Furthermore, when the modeling method of FIG. 2 is implemented as a program, this program may execute, in the computing device 400, a process including an operation for determining whether the instruction set 415 is malicious.

The configuration shown in each conceptual diagram should be understood just from a conceptual point of view. Shape, structure, and size of each component shown in each conceptual diagram are exaggerated or downsized for help understanding of the present disclosure. An actually implemented configuration may have a physical shape different from that shown in each conceptual diagram. The present disclosure is not limited to a physical shape or size illustrated in each conceptual diagram.

A device configuration illustrated each block diagram is provided to help understanding of the present disclosure. Each block may be formed of smaller blocks according to a function. Alternatively, a plurality of blocks may form a larger block according to functions. In other words, the present disclosure is not limited to components illustrated in each block diagram.

According to the example embodiments of the present disclosure, a behavior pattern of system calls, which are generated while an instruction set is being executed in a computing device, may be dynamically collected. A model of the collected behavior pattern may be used to determine whether the executed instruction set is malicious. In particular, a mutant malicious code or an unknown malicious code may also be detected in addition to a previously known malicious code. Furthermore, the model of the collected behavior pattern may be provided as an input of various data mining schemes for learning of a computing device.

The above-disclosed subject matter is to be considered illustrative and not restrictive, and the appended claims are intended to cover all such modifications, enhancements, and other embodiments, which fall within the true spirit and scope of the present disclosure. Thus, to the maximum extent allowed by law, the scope of the inventive concept is to be determined by the broadest permissible interpretation of the following claims and their equivalents, and shall not be restricted or limited by the foregoing descriptions.

What is claimed is:

1. A non-transitory computer-readable storage medium storing a program configured to model a behavior pattern associated with system calls that occur by an instruction set executed in a computing device, the program executing a process, in the computing device, that comprises:

hooking, by a processor of the computing device, the system calls while the instruction set is executed under a control of the processor;

extracting, by the processor, a category to which each of the hooked system calls belongs, with reference to category information stored in at least one of a first storage of the computing device or a second storage provided separately from the computing device;

extracting, by the processor, one or more behavior sequences expressed in an N-gram manner from a full sequence of the hooked system calls, with reference to the extracted category;

generating, by the processor, a model of the behavior pattern based on a number of times that each of the extracted N-gram behavior sequences occurs;

comparing at least one of the generated model of the behavior pattern or the stored model of the behavior pattern with a reference model; and determining, based on the comparison, whether the executed instruction set is malicious or normal.

2. The storage medium of claim 1, wherein the model of the behavior pattern is expressed in a vector format, and the vector format is generated by associating all behavior sequences expressed in the N-gram manner with the number of times that each of the extracted behavior sequences occurs.

3. The storage medium of claim 1, wherein the process further comprises storing information associated with the model of the behavior pattern in at least one of the first storage or the second storage.

4. A method for modeling a behavior pattern associated with system calls that occur by an instruction set executed in a computing device, the method comprising:

hooking, by the computing device, the system calls;

extracting, by the computing device, a category to which each of the hooked system calls belongs;

extracting, by the computing device, one or more behavior sequences expressed in an N-gram manner from a full sequence of the hooked system calls, with reference to the extracted category;

generating, by the computing device, a model of the behavior pattern expressed in a vector format, based on a number of times that each of the extracted N-gram behavior sequences occurs;

comparing at least one of the generated model of the behavior pattern or the stored model of the behavior pattern with a reference model determining, based on the comparison, whether the executed instruction set is malicious or normal.

5. The method of claim 4, wherein the hooking comprises dynamically hooking the system calls while the instruction set is executed in the computing device.

6. The method of claim 4, wherein the vector format is obtained by associating some or all of behavior sequences expressed in the N-gram manner with the number of times that each of the extracted behavior sequences occurs.

* * * * *